(12) United States Patent
Blunier et al.

(10) Patent No.: US 9,090,137 B2
(45) Date of Patent: Jul. 28, 2015

(54) ADJUSTABLE BALLASTED PULL HITCH

(71) Applicant: CNH Industrial America LLC, New Holland, PA (US)

(72) Inventors: Timothy R. Blunier, Danvers, IL (US); Chad W. Coombs, Lexington, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/486,141

(22) Filed: Sep. 15, 2014

(65) Prior Publication Data
US 2015/0130163 A1   May 14, 2015

Related U.S. Application Data

(60) Provisional application No. 61/903,461, filed on Nov. 13, 2013.

(51) Int. Cl.
*B60D 1/58* (2006.01)
*B60D 1/24* (2006.01)
*A01B 59/00* (2006.01)
*B62D 49/06* (2006.01)

(52) U.S. Cl.
CPC .............. *B60D 1/247* (2013.01); *A01B 59/002* (2013.01); *B62D 49/0628* (2013.01)

(58) Field of Classification Search
CPC ........ B60D 1/06; B60D 1/58; B62D 49/0628; B62D 49/085
USPC ................................. 280/405.1, 187
See application file for complete search history.

(56) References Cited

U.S. PATENT DOCUMENTS

| | | | | |
|---|---|---|---|---|
| 2,993,721 A * | 7/1961 | Bowman | ........................ | 293/106 |
| 4,889,212 A * | 12/1989 | Temple | ...................... | 188/112 R |
| 5,330,227 A * | 7/1994 | Anderson | ...................... | 280/759 |
| 6,209,898 B1 * | 4/2001 | Fortier et al. | .................. | 280/187 |
| 7,152,883 B2 * | 12/2006 | Niemela | ....................... | 280/759 |
| 7,523,961 B2 * | 4/2009 | Watkins | ........................ | 280/759 |

* cited by examiner

*Primary Examiner* — Joseph Rocca
*Assistant Examiner* — Michael Stabley
(74) *Attorney, Agent, or Firm* — Rebecca L. Henkel

(57) ABSTRACT

An agricultural implement with a ballasted hitch having an open ended tube and removable ballast blocks sized so that they can be loaded into the hitch tube by hand. The blocks are removably retained in the hitch by a bolted plate or, alternatively, a retaining bolt or pin. The number of ballast blocks needed is determined by the weight and size of any rear implement attachment chosen by a customer.

12 Claims, 3 Drawing Sheets

ADJUSTABLE BALLASTED PULL HITCH

CROSS REFERENCE TO RELATED APPLICATIONS

This is a non-provisional application based upon U.S. provisional patent application Ser. No. 61/903,461, entitled "ADJUSTABLE BALLASTED PULL HITCH", filed Nov. 13, 2013, which is incorporated herein by reference.

BACKGROUND OF THE INVENTION

1. Field of the Invention

The present invention relates to agricultural implements and, more particularly, to hitch assemblies for such implements.

2. Description of the Related Art

Farmers employ a wide variety of tillage implements to prepare soil for planting. Some of these implements include two or more sections or components on a common frame to perform multiple functions. For example, a disk ripper may have a leading row or two of disks followed by an array of harrow tines. There may be additional functional components added to the rear of these sections, such as a crumbler basket which has a reel with a plurality of blades for breaking clods and chopping up remaining debris. The tillage unit is typically fastened by a hitch to and towed by a traction unit such as a common farm tractor and may be supported by a single set of wheels. Different configurations of tillage components, and particularly of rear attachments, result in significant variations in the weight distribution between the implement wheels and the hitch.

To compensate for the weight distribution variations and achieve a fairly uniform hitch weight, ballasted pull hitches are sometimes employed. Typically, a heavy weight ballast is disposed within a hollow portion of the hitch frame and welded in place. This technique employs long lengths of square or rectangular cross-sectional configuration bars permanently welded in place inside the main hitch tubular frame. The ballast may be sealed in place with end caps or gusseting. As the nature of the ballast is very heavy, labor time and effort to perform this work is excessive. Each permanently weighted hitch bears a different part number further complicating the process.

What is needed in the art is an improved technique for ballasting implement hitches.

SUMMARY OF THE INVENTION

The present invention provides a ballasted hitch that is tailored to a particular implement configuration which may be assembled or modified at the factory, dealership, or by the individual farmer.

The invention in one form is directed to a ballasted pull hitch assembly for coupling an agricultural implement to a traction unit and includes a pull frame and a pull hitch. The pull frame has an elongated rigid portion with a generally rectangular hollow interior extending toward the traction unit and terminating at an open end near the pull hitch, and a ballast formed of a plurality of individual ballast units of like cross-sectional configuration. The number and length of ballast units is selected to shift the center of gravity of the agricultural implement forward a preferred distance. The pull hitch includes a coupler adapted to be connected with a mating coupler of the traction unit and at least one hitch plate for joining the coupler with the pull frame rigid portion. There is a ballast retainer fixed to the ballasted pull hitch assembly for retaining the ballast within the hollow interior.

The invention in another form is directed to an agricultural implement with a main frame portion for supporting tools to perform agricultural tasks and a ballasted pull hitch assembly for coupling the main frame portion with a traction unit to be towed thereby in a generally horizontal forward direction of travel. The ballasted pull hitch assembly includes a pull frame and a pull hitch. The pull frame is formed from a transverse portion coupled with the main frame section, a longitudinal portion having a generally rectangular hollow interior extending toward the traction unit and terminating at an open end near the pull hitch, and a ballast of generally rectangular cross-sectional configuration within the longitudinal portion hollow interior. The pull hitch is formed with a coupler adapted to be connected with a mating coupler of the traction unit, at least one hitch plate for joining the coupler with the pull frame longitudinal portion, and a ballast retainer removably fixed to the ballasted pull hitch assembly for retaining the ballast within the longitudinal portion hollow interior.

An advantage of the present invention is reduced labor costs.

Another advantage is a ballast which is easier to load into position.

Yet another advantage is a reduction in hitch part numbers.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
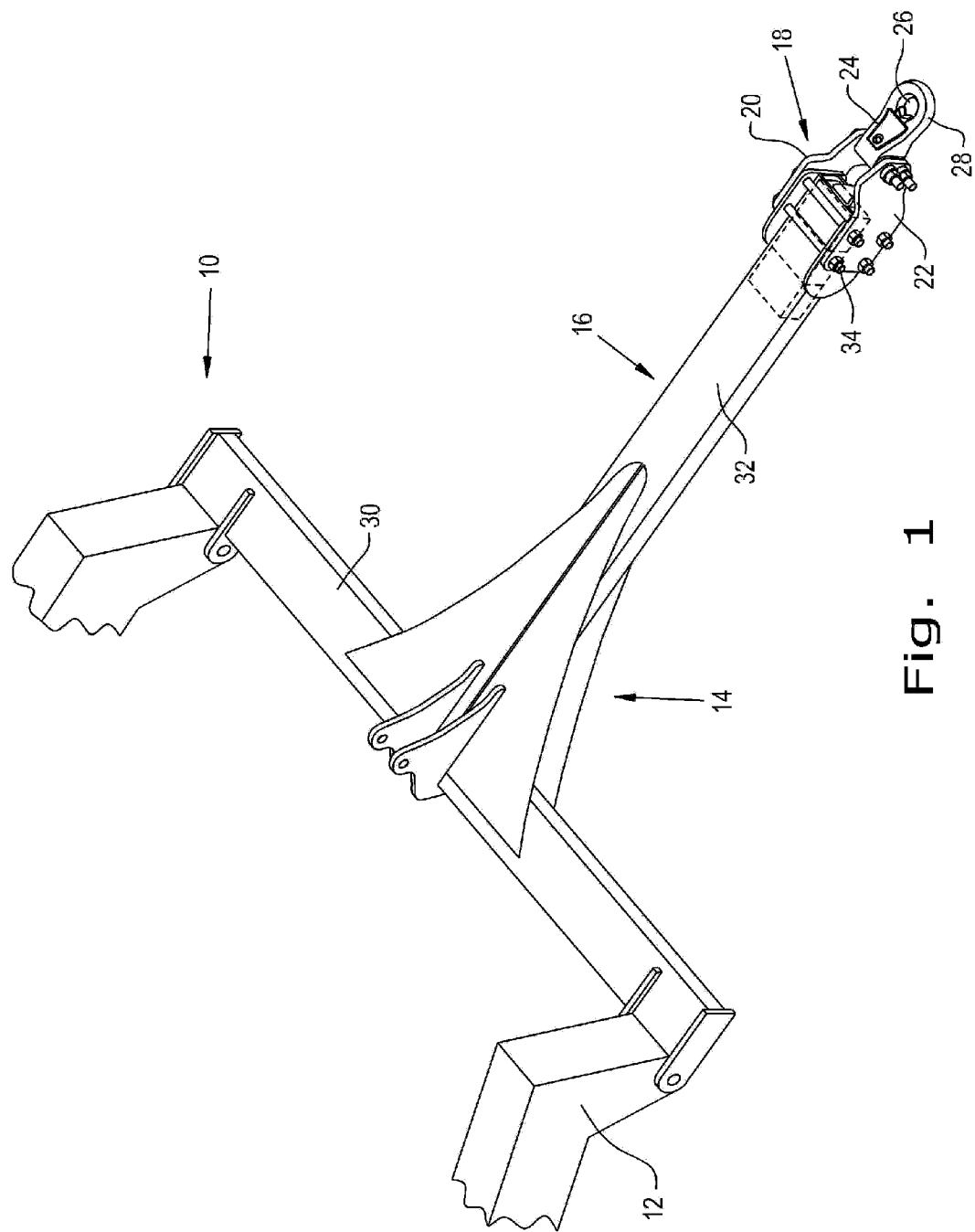
FIG. 1 is an isometric view of a portion of an agricultural implement having a ballasted pull hitch assembly.
Figure 2:
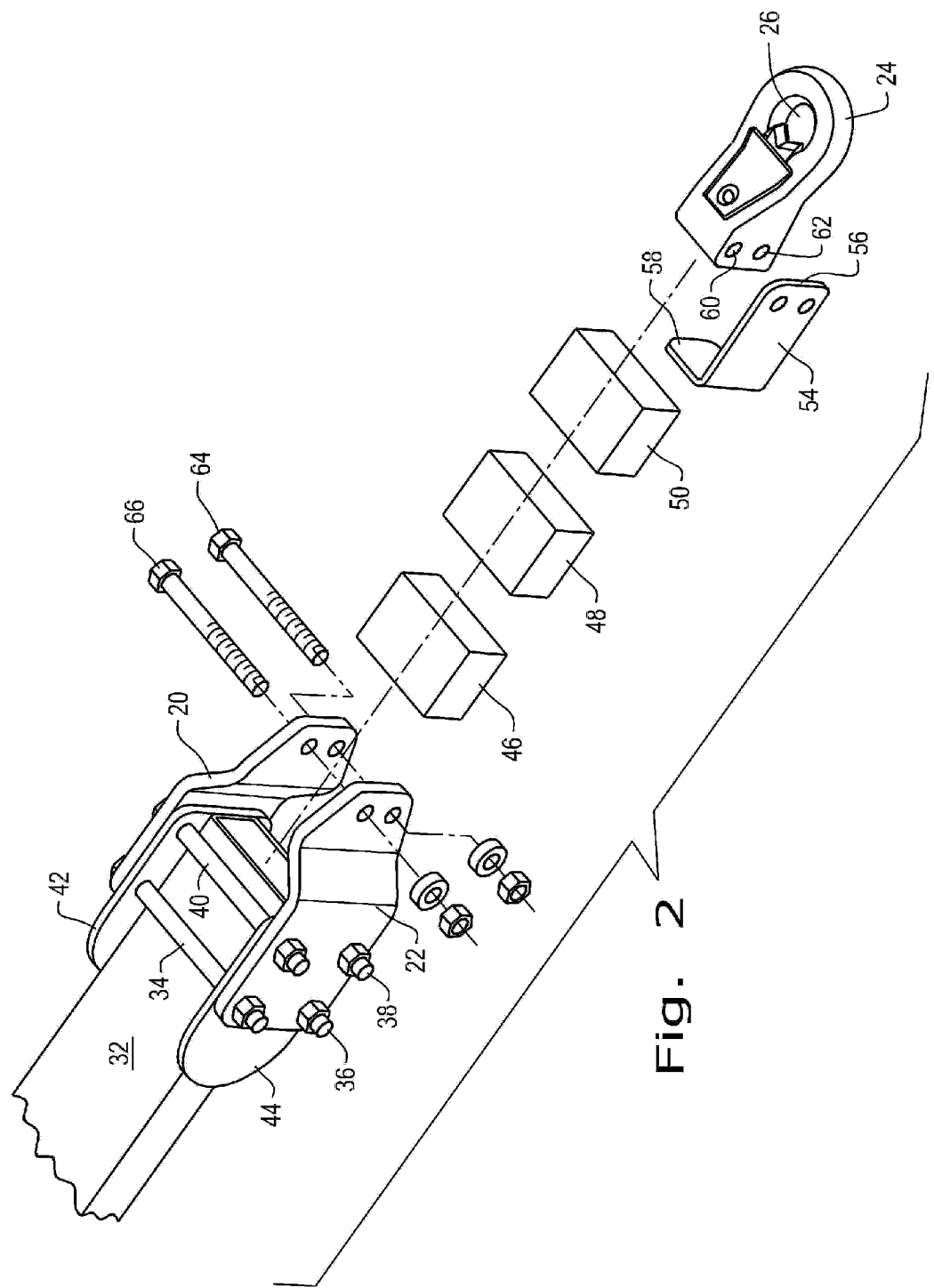
FIG. 2 is an exploded isometric view of the pull frame and pull hitch of FIG. 1.

Referring now to the drawings, and more particularly to FIGS. 1 and 2, there is shown a portion of an agricultural implement 10 which generally includes an implement main frame 12 and a ballasted pull hitch assembly 14. The pull hitch assembly 14 has a pull frame 16 fastened to the implement frame 12 near a rearward end and to a pull hitch 18 near a forward end.

The pull hitch includes a pair of vertically aligned hitch plates 20 and 22 which span and retain a hitch coupler 24. The hitch coupler may be any of several known styles and is illustrated as a simple opening or eye 26 in the forwardly extending tongue 28 for receiving a hitch pin, hook or other type coupler on the traction unit. The coupler may be of any other suitable form such as a clevis with a pair of vertically spaced tongues for receiving a traction unit drawbar. The pull frame is formed by a transverse tubular member 30 fixed to the implement main frame portion 12, and a longitudinally extending hollow rectangular tube 32. The hollow rectangular tube 32 is joined with the pull hitch 18 by four transverse bolts 34, 36, 38 and 40 which engage both hitch plates 20 and 22 as well as apertures in flared portions 42 and 44 of tube 32. Pins with suitable retainers may be substituted for the bolts. Nested within the hollow rectangular tube 32 is a ballast comprising a sequence of individual ballast units such as 46, 48 and 50. Each individual ballast unit is a block of a generally rectangular parallelepiped configuration and the blocks are juxtaposed within the hollow interior.

Figure 3:
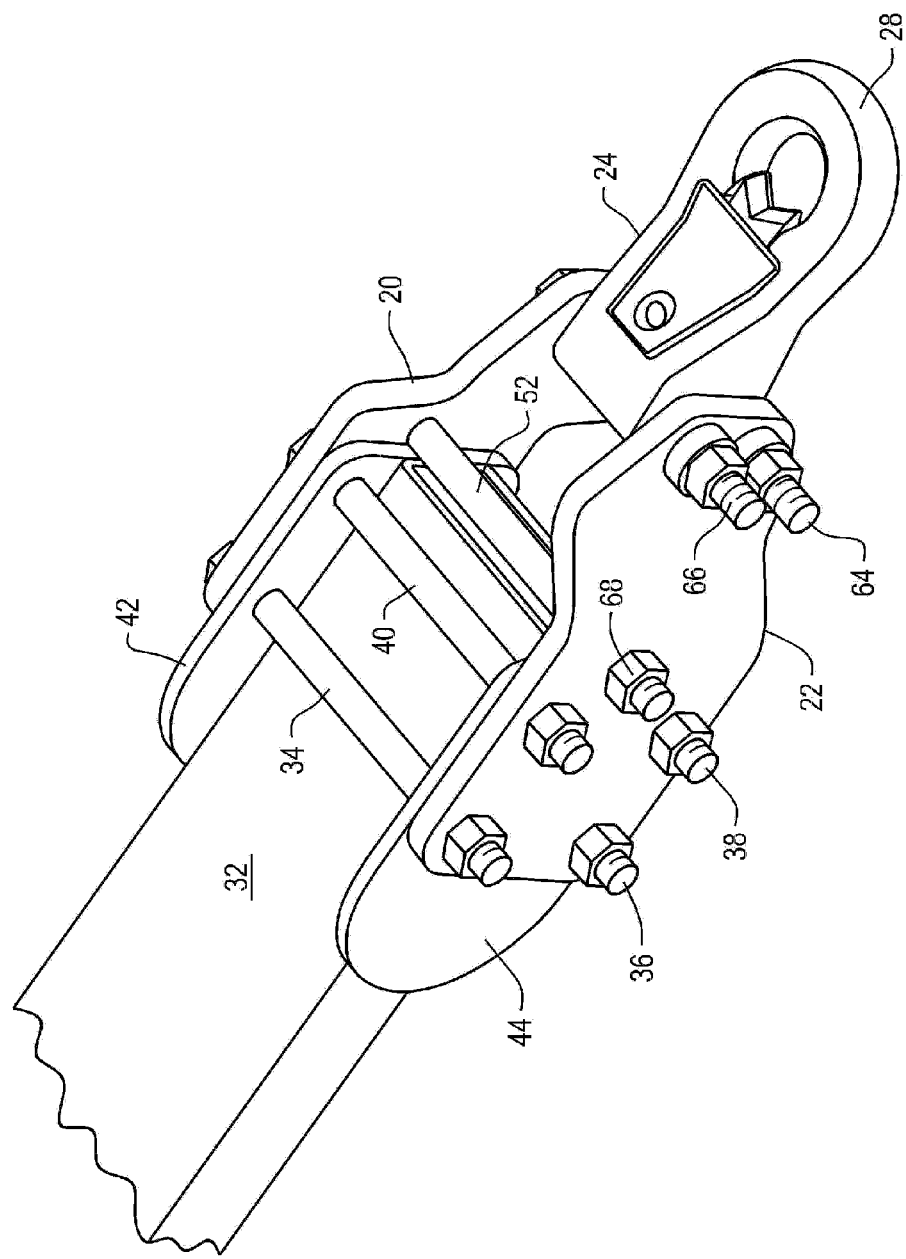
FIG. 3 is an isometric view of a modified pull frame and hitch illustrating an alternative technique for retaining the ballast within the hitch assembly.

Referring now primarily to FIG. 2, before the coupler 24 is joined to the hitch plates, several individual ballast units, each of a convenient weight, are sequentially introduced into the hollow interior of tube 32 through the open end 52. The number and length of individual ballast units is selected to shift the center of gravity of the agricultural implement forward a preferred distance while keeping the weight of each unit manageable. Spring loading, light weight fillers, or other limit on the hollow distance within the tube may be employed to limit rearward movement of the ballast units. A generally L-shaped closure or retainer 54 is then positioned to block the opening 52 thereby capturing the individual ballast units within the tube 32. The retainer comprises a plate with a first leg 56 having a pair of transverse openings for removably fixing it to the hitch plates, and a second leg 58 designed to span the longitudinal portion open end 52. Coupler 24 has openings or through holes 60 and 62 alignable with those in retainer leg 54 so that both the retainer and the coupler may be fixed between plates 20 and 22 by a pair of transverse bolts 64 and 66. As earlier, suitable pins may be used rather than bolts One of several alternatives to retainer 54 is shown in FIG. 3. Here the retainer takes the form of an additional bolt 68 or a pin which passes through both hitch plates 20 and 22 at a location to block the open end 52 trapping the individual ballast units within the rectangular hollow space.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
a main frame portion for supporting tools to perform agricultural tasks, and a ballasted pull hitch assembly for coupling the main frame portion with a traction unit to be towed thereby in a generally horizontal forward direction of travel; said ballasted pull hitch assembly comprising a pull frame and a pull hitch;
said pull frame comprising:
a transverse portion coupled with the main frame section;
a longitudinal portion having a generally rectangular hollow interior extending toward the traction unit and terminating at an open end near said pull hitch; and
a ballast of generally rectangular cross-sectional configuration within said longitudinal portion hollow interior;
said pull hitch comprising:
a coupler adapted to be connected with a mating coupler of the traction unit;
at least one hitch plate for joining the coupler with the pull frame longitudinal portion; and
a ballast retainer removably fixed to the ballasted pull hitch assembly for retaining the ballast within the longitudinal portion hollow interior.

2. The agricultural implement of claim 1, wherein there are two vertically aligned hitch plates spaced from one another to span the longitudinal portion and to receive the coupler therebetween, and the retainer comprises a member spanning the plates in close proximity to the longitudinal portion open end.

3. The agricultural implement of claim 1, wherein the retainer comprises a generally L-shaped plate having a first leg removably fixed to the hitch plate and a second leg spanning the longitudinal portion open end.

4. The agricultural implement of claim 1, wherein the ballast comprises a plurality of blocks of a generally rectangular parallelepiped configuration juxtaposed within the longitudinal portion hollow interior.

5. A ballasted pull hitch assembly for coupling an agricultural implement to a traction unit, comprising a pull frame and a pull hitch;
said pull frame including:
an elongated rigid portion having a generally rectangular hollow interior extending toward the traction unit and terminating at an open end near said pull hitch; and
a ballast of generally rectangular cross-sectional configuration within said hollow interior;
said pull hitch including:
a coupler adapted to be connected with a mating coupler of the traction unit;
at least one hitch plate for joining the coupler with the pull frame rigid portion; and
a ballast retainer removably fixed to the ballasted pull hitch assembly for retaining the ballast within the hollow interior.

6. The ballasted pull hitch assembly of claim 5, wherein the ballast comprises a plurality of individual ballast units of like cross-sectional configuration, the number and length of ballast units being selected to shift the center of gravity of the agricultural implement forward a preferred distance.

7. The ballasted pull hitch assembly of claim 5, wherein there are two vertically aligned hitch plates spaced from one another to span the longitudinal portion and to receive the coupler therebetween, and the retainer comprises a member spanning the plates in close proximity to the open end.

8. The ballasted pull hitch assembly of claim 5, wherein the retainer comprises a generally L-shaped plate having a first leg removably fixed to the hitch plate and a second leg spanning the open end.

9. The ballasted pull hitch assembly of claim 5, wherein the ballast comprises a plurality of blocks of a generally rectangular parallelepiped configuration juxtaposed within the hollow interior.

10. A ballasted pull hitch assembly for coupling an agricultural implement to a traction unit, comprising a pull frame and a pull hitch;
said pull frame including:
an elongated rigid portion having a generally rectangular hollow interior extending toward the traction unit and terminating at an open end near said pull hitch; and
a ballast comprising a plurality of individual ballast units of like cross-sectional configuration disposed within the opening, the number and length of ballast units selected to shift the center of gravity of the agricultural implement forward a preferred distance;

said pull hitch including:
- a coupler adapted to be connected with a mating coupler of the traction unit;
- at least one hitch plate for joining the coupler with the pull frame rigid portion; and
- a ballast retainer fixed to the ballasted pull hitch assembly for retaining the ballast within the hollow interior.

11. The ballasted pull hitch assembly of claim 10, wherein there are two vertically aligned hitch plates spaced from one another to span the longitudinal portion and to receive the coupler therebetween, and the retainer comprises a removable member spanning the plates in close proximity to the open end.

12. The ballasted pull hitch assembly of claim 10, wherein the retainer comprises a generally L-shaped plate having a first leg removably fixed to the hitch plate and a second leg spanning the open end.

* * * * *